(12) United States Patent
Goodridge

(10) Patent No.: US 11,687,674 B2
(45) Date of Patent: Jun. 27, 2023

(54) COMPUTER DEVICE AND METHOD FOR MANAGING PRIVILEGE DELEGATION

(71) Applicant: Avecto Limited, Manchester (GB)

(72) Inventor: John Goodridge, Sale (GB)

(73) Assignee: Avecto Limited, Manchester (GB)

(*) Notice: Subject to any disclaimer, the term of this patent is extended or adjusted under 35 U.S.C. 154(b) by 142 days.

(21) Appl. No.: 17/343,120

(22) Filed: Jun. 9, 2021

(65) Prior Publication Data
US 2021/0294919 A1 Sep. 23, 2021

Related U.S. Application Data

(63) Continuation of application No. 16/142,894, filed on Sep. 26, 2018, now Pat. No. 11,062,055.

(30) Foreign Application Priority Data

Sep. 27, 2017 (GB) ...................................... 1715628

(51) Int. Cl.
*G06F 21/62* (2013.01)

(52) U.S. Cl.
CPC ........ *G06F 21/6281* (2013.01); *G06F 21/629* (2013.01)

(58) Field of Classification Search
CPC ............... G06F 21/629; G06F 21/6281; G06F 21/6209; G06F 21/32
See application file for complete search history.

(56) References Cited

U.S. PATENT DOCUMENTS

| 5,881,225 A | 3/1999 | Worth |
|---|---|---|
| 5,991,542 A | 11/1999 | Han et al. |

(Continued)

FOREIGN PATENT DOCUMENTS

| EP | 2750035 A1 | 7/2014 |
|---|---|---|
| GB | 2486528 B | 9/2016 |

(Continued)

OTHER PUBLICATIONS

Examination Report dated Apr. 29, 2020 for United Kingdom Patent Application No. GB1715628.2.

(Continued)

*Primary Examiner* — Dao Q Ho
(74) *Attorney, Agent, or Firm* — Morris, Manning & Martin, LLP; Daniel E. Sineway, Esq.; Adam J. Thompson, Esq.

(57) ABSTRACT

A computer device that manages privilege delegation is disclosed. The computing device can insert a custom verb command into a plurality of verb commands corresponding to a file. The computing device can intercept a request to execute the custom verb command on the file by intercepting a request to create a context menu. The computer device can obtain information related to the request to execute the custom verb command by obtaining a file identifier of the file from the request to create the context menu. The computer device can determine whether to execute the custom verb command on the file according to second privileges different from the first privileges based on the information related to the request to execute the custom verb command. The computer device can cause the custom verb command to be executed on the file according to the second privileges.

20 Claims, 4 Drawing Sheets

(56) References Cited

U.S. PATENT DOCUMENTS

| | | | |
|---|---|---|---|
| 6,233,618 B1 | 5/2001 | Shannon | |
| 7,133,904 B1 | 11/2006 | Soyha et al. | |
| 7,219,354 B1 | 5/2007 | Huang et al. | |
| 8,368,640 B2 | 2/2013 | Dardinski et al. | |
| 9,158,662 B1 | 10/2015 | Hanes et al. | |
| 9,607,137 B2* | 3/2017 | Nicholson | G10L 15/22 |
| 9,769,131 B1 | 9/2017 | Hartley | |
| 10,803,499 B1 | 10/2020 | Davis et al. | |
| 2002/0144137 A1 | 10/2002 | Harrah et al. | |
| 2002/0174256 A1* | 11/2002 | Bonilla | G06F 21/629 |
| | | | 719/310 |
| 2003/0038846 A1* | 2/2003 | Hori | G06F 9/453 |
| | | | 715/809 |
| 2004/0046804 A1* | 3/2004 | Chang | G06F 3/0482 |
| | | | 715/810 |
| 2004/0210771 A1 | 10/2004 | Wood et al. | |
| 2004/0223001 A1* | 11/2004 | Peng | H04N 21/485 |
| | | | 345/619 |
| 2005/0188370 A1* | 8/2005 | Kouznetsov | G06F 9/468 |
| | | | 717/174 |
| 2006/0089834 A1 | 4/2006 | Mowatt et al. | |
| 2006/0287866 A1* | 12/2006 | Cross | G10L 15/197 |
| | | | 704/275 |
| 2007/0180502 A1* | 8/2007 | Yadav | G06F 9/45512 |
| | | | 726/5 |
| 2007/0198933 A1 | 8/2007 | van der Bogert et al. | |
| 2008/0060051 A1 | 3/2008 | Lim | |
| 2008/0289026 A1 | 11/2008 | Abzarian et al. | |
| 2009/0029329 A1* | 1/2009 | Ackloo | G09B 13/04 |
| | | | 434/227 |
| 2009/0070442 A1 | 3/2009 | Kacin et al. | |
| 2010/0274366 A1 | 10/2010 | Fata et al. | |
| 2011/0030045 A1 | 2/2011 | Beauregard et al. | |
| 2011/0173251 A1 | 7/2011 | Sandhu et al. | |
| 2011/0196842 A1 | 8/2011 | Timashev et al. | |
| 2011/0239288 A1 | 9/2011 | Cross et al. | |
| 2011/0251992 A1 | 10/2011 | Bethlehem et al. | |
| 2012/0047259 A1 | 2/2012 | Krasser et al. | |
| 2012/0054744 A1 | 3/2012 | Singh et al. | |
| 2012/0066512 A1 | 3/2012 | Kass et al. | |
| 2012/0226742 A1 | 9/2012 | Mornchilov et al. | |
| 2013/0057561 A1 | 3/2013 | Nave et al. | |
| 2013/0339313 A1 | 12/2013 | Blaine et al. | |
| 2014/0157182 A1* | 6/2014 | Kim | G06F 3/04883 |
| | | | 715/780 |
| 2014/0279600 A1 | 9/2014 | Chait | |
| 2014/0281528 A1 | 9/2014 | Dubey et al. | |
| 2015/0040181 A1 | 2/2015 | Cook et al. | |
| 2015/0058839 A1 | 2/2015 | Madanapalli et al. | |
| 2015/0074828 A1 | 3/2015 | Beauregard et al. | |
| 2015/0128250 A1* | 5/2015 | Lee | G06F 21/554 |
| | | | 726/16 |
| 2016/0132195 A1* | 5/2016 | Seto | G06F 9/451 |
| | | | 715/765 |
| 2016/0203313 A1 | 7/2016 | El-Moussa et al. | |
| 2016/0210018 A1* | 7/2016 | Singal | G06F 3/04886 |
| 2016/0217159 A1 | 7/2016 | Dahan et al. | |
| 2016/0378962 A1 | 12/2016 | Austin | |
| 2017/0011220 A1 | 1/2017 | Efremov et al. | |
| 2017/0048259 A1 | 2/2017 | Dodge et al. | |
| 2017/0054760 A1 | 2/2017 | Barton et al. | |
| 2017/0111368 A1 | 4/2017 | Hibbert et al. | |
| 2018/0024895 A1 | 1/2018 | Kumarasamy et al. | |
| 2018/0302409 A1 | 10/2018 | Hope | |
| 2018/0336360 A1* | 11/2018 | Kolishchak | G06F 21/604 |
| 2019/0121631 A1 | 4/2019 | Hua et al. | |
| 2021/0294919 A1* | 9/2021 | Goodridge | G06F 21/6281 |

FOREIGN PATENT DOCUMENTS

| | | |
|---|---|---|
| GB | 2538518 A1 | 11/2016 |
| GB | 2563066 A | 12/2018 |
| KR | 101308859 B1 | 9/2013 |
| NO | 2006101549 A2 | 9/2006 |
| NO | 2007089786 A1 | 8/2007 |
| NO | 2015183493 A1 | 12/2015 |
| NO | 2018174990 A1 | 9/2018 |

OTHER PUBLICATIONS

Examination Report dated Feb. 22, 2018 for United Kingdom Patent Application No. GB1715628.2.
Intention to Grant under Section 18(4) dated Jun. 25, 2020 for United Kingdom Patent Application No. GB1715628.2.
Combined Examination & Search Report dated Dec. 1, 2017 for United Kingdom Patent Application No. 3B1708824.6.
Combined Examination & Search Report dated Mar. 6, 2019 for United Kingdom Patent Application No. 3B18147983.
CombinedExamination & Search Report dated Nov. 16, 2018 for United Kingdom Patent Application No. 3B1808380.8.
CombinedExamination & Search Report dated Aug. 1, 2018 for United Kingdom Patent Application No. 3B1802241.8.
Combined Examination & Search Report dated Feb. 6, 2018 for United Kingdom Patent Application No. 3B1714489.0.
Examination Report dated Jun. 14, 2019 for United Kingdom Patent Application No. GB1600738.7.
Chris HoFfman; "How to Disable System Integrity Protection on a Mac (and Why You Shouldn't)"; HowToGeek.com website [full url in ref.]; Jul. 5, 2017 (Year 2017).
Chris Hoffman and Justin Pot; "How to Install Applications on a Mac: Everything You Need to Know"; FlowToGeek.com website [full url in ref.]; Jul. 20, 2017 (Year: 2017).

* cited by examiner

COMPUTER DEVICE AND METHOD FOR MANAGING PRIVILEGE DELEGATION

CROSS REFERENCE TO RELATED APPLICATION

This application is a continuation of U.S. patent application Ser. No. 16/142,894, filed Sep. 26, 2018, which claims the benefit of priority from G.B. Application No. 1715628.2, filed Sep. 27, 2017, the disclosures of which are incorporated herein by reference in their entireties.

TECHNICAL FIELD

The present invention relates generally to the field of computers and computer devices. More particularly, the present invention relates to a computer device and a method for managing privilege delegation, for example, to control execution of commands on files on the computer device.

BACKGROUND

It is desirable to implement a least-privilege access security model, whereby each user is granted only a minimal set of access privileges. However, many applications require a relatively high privilege level, such as a local administrator level rather than a default user level, in order to install and/or operate correctly.

Some forms of privilege management allow granting of temporary privileges to specific users. For example, a user account of a specific user may be temporarily added to a privileged group, having elevated privileges. For a pre-set time period, the user has all the privileges and access permissions assigned to that group. After that time period, the user account is removed from the group and the privileges for the user reverted. Such privilege management typically demands additional administration burden and may require expert users having appropriate knowledge and credentials. However, such privilege management may not readily scale across organizations, having hundreds or even thousands of users, including remote users. Furthermore, such privilege management may not provide desired flexibility, because configuration may be required in advance rather than available dynamically or on an ad hoc basis, for example. In addition, granting of temporary, elevated privileges for pre-set time periods may allow malicious attackers to penetrate networks via the elevated privileges, thus presenting a security vulnerability.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device, a method and a computer-readable storage medium as set forth in the appended claims. Additional features of the invention will be apparent from the dependent claims, and the description herein.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In general, there is described an improved computer device and method for managing privilege delegation to control execution of commands on files on the computer device. Particularly, by intercepting requests in user accounts to execute commands therein on files according to first privileges assigned thereto and determining whether to execute the commands on the files according to second privileges, the commands are executed on the files in the user accounts according to the second privileges, for example via agent proxy processes launched in the user accounts. This mechanism may be specifically for the requests. In addition, the first privileges associated with the user accounts may be unchanged by this mechanism. In this way, scalability may be improved since administrative burden may be reduced. Furthermore, flexibility may be improved, because privilege delegation may be available dynamically and/or on an ad hoc basis, for example for specific commands and/or specific files. In addition, since the commands are executed on the files via the agent proxy processes having the second privileges assigned thereto, rather than by assigning the second privileges to the user account as may be provided conventionally for example, a security vulnerability may be reduced.

In one example, there is described a computer device, including at least a processor and a memory, configured to manage privilege delegation to control execution of commands on files on the computer device, the computer device comprising: an operating system and an agent cooperating with the operating system; wherein the agent is configured to: intercept a request in a user account of a logged-in user to execute therein a command on the file according to first privileges assigned thereto; obtain information related to the request; determine whether to execute the command on the file in the user account according to second privileges different from the first privileges; and cause the command to be executed on the file in the user account by the operating system according to the second privileges, if it is determined to execute the command on the file in the user account according to the second privileges.

In one example, the agent comprises an agent service cooperating with the operating system, an agent plugin provided for the file and an agent proxy process having the second privileges assigned thereto by the agent service.

In one example, there is described a computer device, including at least a processor and a memory, configured to manage privilege delegation to control execution of commands on files on the computer device, the computer device comprising: an operating system, an agent service cooperating with the operating system and an agent plugin provided for a file; wherein the agent plugin is configured to: intercept a request in a user account of a logged-in user to execute therein a command on the file according to first privileges assigned thereto; and obtain information related to the request and forward the information to the agent service; wherein the agent service is configured to: determine whether to execute the command on the file in the user account according to second privileges different from the first privileges; and launch an agent proxy process having the second privileges assigned thereto by the agent service, if it is determined to execute the command on the file in the user account according to the second privileges, wherein the agent proxy process is configured to cause the command to be executed on the file in the user account by the operating system, according to the second privileges assigned to the agent proxy process.

In one example, the agent plugin is configured to intercept the request by intercepting a request to create a context menu for the file, wherein the context menu includes a plurality of verb commands, each verb command corresponding to a respective command on the file and wherein the agent plugin is configured to obtain the information related to the request by obtaining a file identifier of the file from the request to create the context menu.

In one example, the agent is configured to insert a custom verb command into the plurality of verb commands.

In one example, the agent is configured to insert the custom verb command into the plurality of verb commands comprises by replacing a verb command of the plurality of verb commands with the custom verb command.

In one example, the agent is configured to obtain the information related to the request by obtaining a particular verb command from amongst the plurality of verb commands, responsive to a user selection, by the user, of the particular verb command.

In one example, wherein the agent service is configured to determine whether to execute the command on the file in the user account according to the second privileges by consulting a plurality of rules, stored on the computer device, according to, at least in part, the forwarded information.

In one example, the agent service is configured to determine whether to execute the command on the file in the user account according to the second privileges by establishing authorization from the user to execute the command.

In one example, the agent service is configured to establish authorization by providing a graphical user interface, GUI, dialog comprising at least one of a confirmation, a challenge-response, and a reason and receiving a response therefrom.

In one example, the agent service is configured to determine whether to execute the command on the file in the user account according to the second privileges by permitting or denying, by the agent service, the authorization to execute the command.

In one example, the agent proxy process is configured to be terminated after causing the command to be executed on the file in the user account.

In one example, there is described a method of managing privilege delegation to control execution of commands on files on a computer device, the method being implemented by hardware of the computer device including at least a processor and a memory, the method comprising: intercepting, by an agent, a request in a user account of a logged-in user to execute a command therein on a file according to first privileges assigned thereto; obtaining, by the agent, information related to the request; determining, by the agent, whether to execute the command on the file in the user account according to second privileges different from the first privileges; and causing, by the agent, the command to be executed on the file in the user account by the operating system, according to the second privileges if it is determined to execute the command on the file in the user account according to the second privileges.

In one example, the agent comprises an agent service cooperating with the operating system, an agent plugin provided for the file and an agent proxy process having the second privileges assigned thereto by the agent service.

In one example, there is described a method of managing privilege delegation to control execution of commands on files on a computer device, the method being implemented by hardware of the computer device including at least a processor and a memory, the method comprising: intercepting, by an agent plugin, a request in a user account of a logged-in user to execute a command therein on a file according to first privileges assigned thereto, wherein the agent plugin is provided for the file; obtaining, by the agent plugin, information related to the request and forwarding the information to an agent service cooperating with an operating system of the computer device; determining, by the agent service, whether to execute the command on the file in the user account according to second privileges different from the first privileges; launching, by the agent service, an agent proxy process having the second privileges assigned thereto by the agent service, if it is determined to execute the command on the file in the user account according to the second privileges; and causing, by the agent proxy process, the command to be executed on the file in the user account by the operating system, according to the second privileges assigned to the agent proxy process.

In one example, intercepting the request comprises intercepting a request to create a context menu for the file, wherein the context menu includes a plurality of verb commands, each verb command corresponding to a respective command on the file and wherein obtaining the information related to the request comprises obtaining a file identifier of the file from the request to create the context menu.

In one example, the method comprises inserting, by the agent plugin, a custom verb command into the plurality of verb commands.

In one example, inserting the custom verb command into the plurality of verb commands comprises replacing, by the agent plugin, a verb command of the plurality of verb commands with the custom verb command.

In one example, obtaining the information related to the request comprises obtaining a particular verb command from amongst the plurality of verb commands, responsive to a user selection, by the user, of the particular verb command.

In one example, determining whether to execute the command on the file in the user account according to the second privileges comprises consulting a plurality of rules, stored on the computer device, according to, at least in part, the forwarded information.

In one example, determining whether to execute the command on the file in the user account according to the second privileges comprises establishing, by the agent service, authorization from the user to execute the command.

In one example, establishing authorization comprises providing a graphical user interface, GUI, dialog comprising at least one of a confirmation, a challenge-response, and a reason, and receiving a response therefrom.

In one example, determining whether to execute the command on the file in the user account according to the second privileges comprises permitting or denying, by the agent service, the authorization to execute the command.

In one example, the method comprises terminating the agent proxy process after causing the command to be executed on the file in the user account.

In one example, there is provided a tangible non-transient computer-readable storage medium having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following examples provide an improved mechanism for managing privilege delegation in a computer device or computer network. The example mechanism is simple and convenient for a user, and is lightweight to implement. Further, the example embodiments uphold security of computer devices while provided an enhanced gateway for privilege delegation. Many other advantages and improvements will be discussed in more detail herein.

Figure 1:
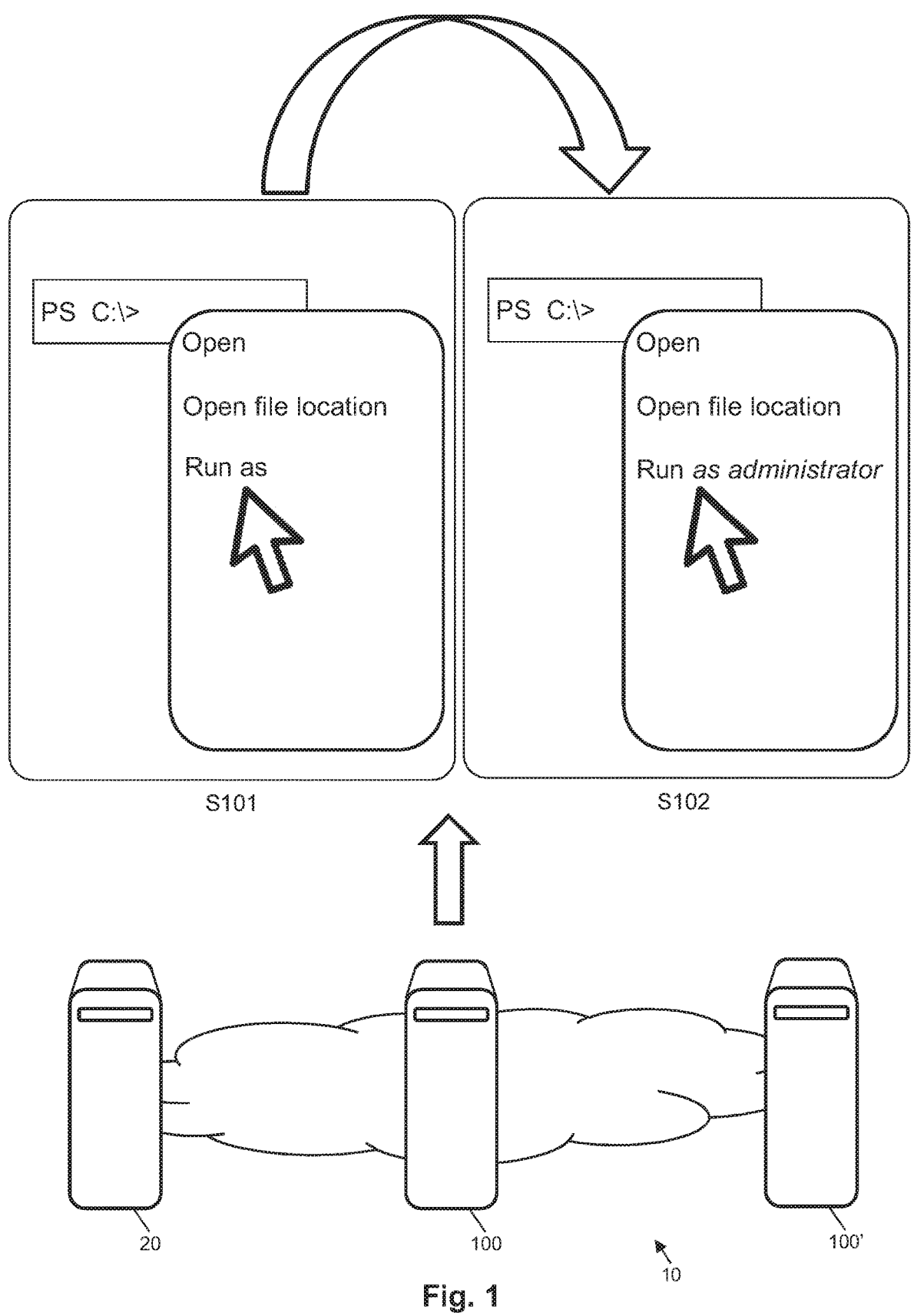
FIG. 1 is a schematic view of part of a network including an example computer device.

FIG. 1 is a schematic overview of part of a computer network 10 including an example computer device 100. Particularly, the computer device 100 is configured to manage privilege delegation to control execution of commands on files on the computer device 100. In this way, flexibility may be improved while potential attack vector windows, as provided by conventional granting of temporary privileges, may be reduced or avoided.

The computer device 100 comprises an agent, as described in more detail below with reference to FIG. 2. The agent is configured to intercept a request in a user account of a logged-in user to execute therein a command on the file according to first privileges assigned thereto. In this example, the agent intercepts a Run as request for Windows PowerShell, according to default user privileges, as shown schematically at S101. The agent is configured to obtain information related to the request. In this example, the agent obtains the information including a verb command Tunas' and a file identifier 'Windows PowerShell'. The agent is configured to determine whether to execute the command on the file in the user account according to second privileges different from the first privileges. In this example, the agent determines whether to execute a command 'run as' corresponding to the verb command Tunas' on a file identified by the file identifier 'Windows PowerShell', according to local administrator privileges. The agent is configured to cause the command to be executed on the file in the user account by the operating system according to the second privileges, if it is determined to execute the command on the file in the user account according to the second privileges. In this example, the agent causes the command 'run as' to be executed on the file in the user account according to the local administrator privileges, as shown schematically at S102, rather than according to the default user privileges. This mechanism may be specifically for the request. In addition, the first privileges associated with the user account may be unchanged by this mechanism. In this way, scalability may be improved since administrative burden may be reduced. Furthermore, flexibility may be improved, because privilege delegation may be available dynamically and/or on an ad hoc basis, for example for specific commands and/or specific files. In addition, since the command is executed on the file via the agent, rather than by assigning the second privileges to the user account as may be provided conventionally for example, a security vulnerability may be reduced.

In this simplified example, the computer device 100 is coupled by the network 10 to another computer device 100' and a server 20. For example, the network 10 can be a private network, a virtual private network, an intranet, a cloud, or the Internet. In practice, computing environments for large-scale corporations include many thousands of individual user computer devices 100 coupled to thousands of individual servers 20 in several logical domains.

Figure 2:
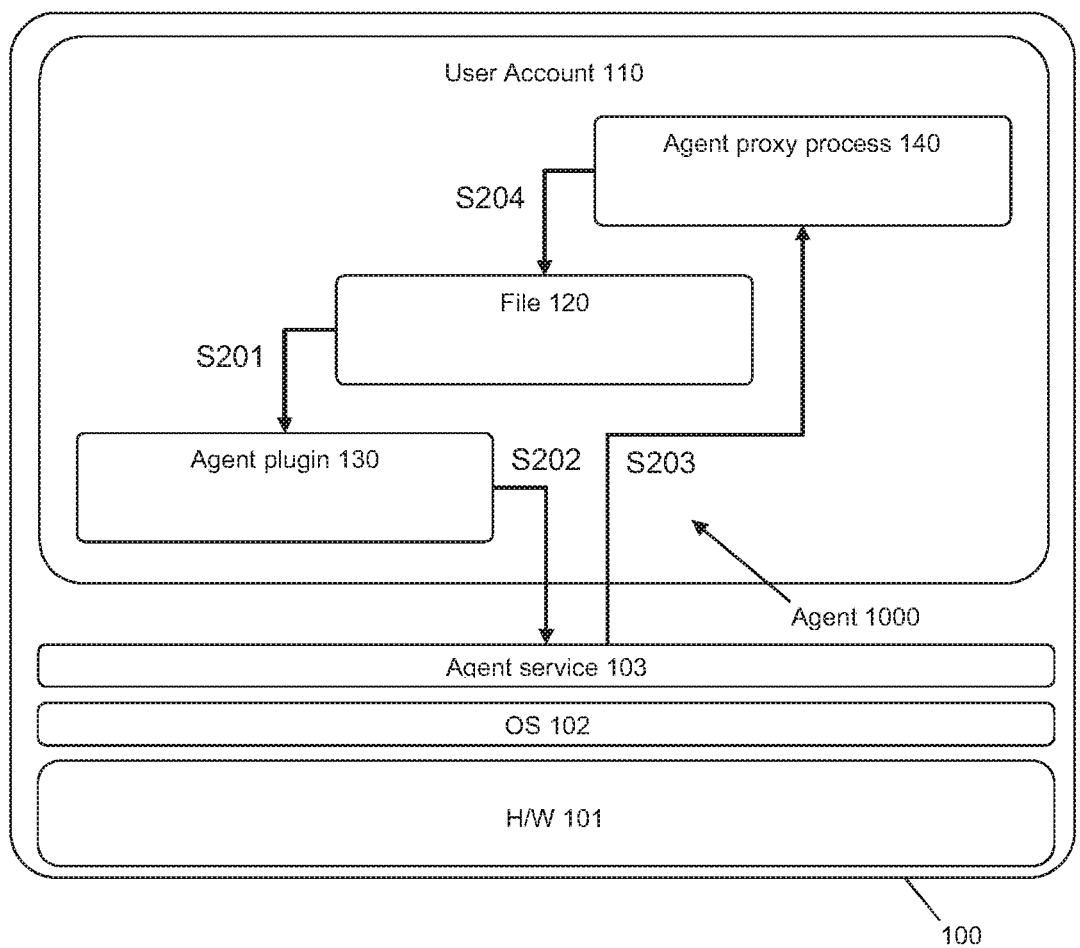
FIG. 2 is a schematic view of the computer device in more detail, in operation.

FIG. 2 is a schematic view of the computer device 100 in more detail.

The computer device 100 may take any suitable form factor, which might be a server, a desktop computer, a portable computing device, laptop, tablet, smartphone, etc. The illustrated computer device 100 comprises a layer of physical hardware H/W 101, which suitably includes memory, processors (CPUs), I/O input/output interfaces (e.g. NIC network interface cards, USB universal serial bus interfaces, etc.), storage (e.g. solid state nonvolatile storage or hard disk drive) and so on. The hardware layer 101 supports the operating system 102 to provide a runtime environment for execution of user processes or productivity applications. This runtime environment typically provides resources such as installed software, system agent services, drivers, and files.

Some of the example embodiments are discussed in detail in relation to computers and computer devices using the Windows® operating system, for example the operating system 102, as supplied by Microsoft Corporation of Redmond, Wash., USA, under the trade marks Windows NT, Windows 2000, Windows XP, Windows Vista, Windows Server 2003, Windows Server 2008, Windows 7, Windows 8, Windows 10 or later versions, amongst others. However, the teachings, principles and techniques of the present invention are also applicable in other practical embodiments. For example, the described embodiments are also applicable to other operating systems, such as UNIX®, Linux®, mac OS®, iOS® and Android®, and in particular those having a discretionary access control security model.

In this example, the operating system 102 applies a security model wherein access privileges are based on a user account 110. The operating system 102 may define privilege levels appropriate to different classes of users, or groups of users, and then apply the privileges of the relevant class or group to the particular logged-in user (e.g. ordinary user, super-user, local administrator, system administrator and so on). The current user is authenticated such as by logging-in to the computer device 100, e.g. with a user identity and password, and these user credentials may be validated locally or via a remote agent service such as a domain controller. The user, via their previously prepared security account, thus acts as a security principal in the security model. The operating system 102 of the computer device 100 then grants privileges, appropriate to the security context of the user account 110, to the files 120 when they execute in the user account 110. Particularly, when executing in the user account 110, the operating system 102 grants first privileges to the files 120, for example, by default.

When considering privilege management, it is desirable to implement a least-privilege access security model, whereby each user is granted only a minimal set of access privileges for their user account 110, for example the first privileges. However, many applications require a relatively high privilege level, such as a local administrator level, in order to install and operate correctly. Hence, in practice, there is a widespread tendency to grant elevated privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, leading to errors or corruption within the computer device. Further, an infection or malware may maliciously access resources of the computer device 100 with the deliberate intention of subverting security or causing damage.

In this example, the computer device 100 further comprises an agent 1000, comprising an agent service 103 cooperating with the operating system 102, an agent plugin 130 provided for the file 120 and an agent proxy process 140 having the second privileges assigned thereto by the agent service 103, as described below in more detail. It should be understood that in this example, the agent 1000 comprises the agent service 103, the agent plugin 130 and the agent proxy process 140. However, this example is not limiting and other implementations are possible. For example, the agent 1000 may be configured to provide any of the functionality of the agent service 103, the agent plugin 130 and/or the agent proxy process 140. For example, more or fewer software components may be provided to provide the functionality of the agent 1000.

The agent service 103 may comprise one or more software and/or hardware modules, such as executables, dynamic link libraries (DLLs), plug-ins, add-ins, add-ons or extensions. The agent service 103 is configured to operate in cooperation with the operating system 102 and the client applications 120. In particular, the agent service 103 may provide and coordinate core capabilities for security, which suitably include at least privilege management and application control.

For application control, the agent service 103 is arranged to ensure that only authorized applications operate on the computer device 100. For example, the agent 103 is governed by rules based on trusted application types, thereby automatically stopping unapproved applications from running. There may be a sophisticated set of rules which define the conditions under which each application may operate, in relation to the intended host computer device 100 and the relevant user account 110.

Generally, the file 120 may be a productivity application (i.e. an executable file), for example Internet Explorer or Microsoft Word, or a file, such as a document, associated with the productivity application. Thus, executing a command on the file generally causes execution of the productivity application directly or indirectly, such as when the command is executed for the document associated with the productivity application.

In Microsoft Windows, for example, the file 120 may be a Shell object, for example a file or a folder. Generally, in Windows Shell programming, the Windows Shell namespace is an organized tree-structured hierarchical representation that Windows Explorer facilitates to graphically present file system contents and other objects to the user. Conceptually, the Windows Shell namespace may be regarded as a larger and more inclusive version of the file system. The Windows Shell namespace consists of two basic types of objects: files and folders. Folder objects, which are containers for file objects and other folders called subdirectories, are the nodes of the tree, while file objects are the leaves of the namespace tree. Objects in the Shell namespace can represent physically stored file system objects such as files and folders, or can be virtual objects such as the My Network Places and Recycle Bin virtual folders.

In this example, the computer device 100 further comprises the agent plugin 130 provided for the file 110. The agent plugin 130 may comprise one or more software and/or hardware modules, such as executables, dynamic link libraries (DLLs), plug-ins, add-ins, add-ons or extensions. For example, the agent plugin 130 may be provided for the file 110 by injecting the agent plugin 110 into the file 110, such as on and/or during loading and/or launching of the file 110. Alternatively, the agent plugin 130 may be provided, at least in part, in the file 130. The agent plugin 130 may be configured to operate in cooperation with the agent service 103 and the file 120. In particular, the agent plugin 130 is configured to intercept a request in the user account 110 of a logged-in user to execute a command on the file 130 in the user account 110 having first privileges assigned thereto. For example, the request may result from the user selecting an icon or a name of the file 120 in a browser, clicking or double left-clicking on the icon or the name of the file 120, right-clicking on the icon or the name of the file 120 so as to launch a context menu or dragging the icon or the name of the file 120 onto a tool or agent service. For example, the agent plugin 130 may be configured to intercept the request by hooking relevant application programming interfaces (APIs) of and/or related to the file 120. Further, the agent plugin 130 is configured to obtain information related to the request and forward the information to the agent service 103. For example, the agent plugin 130 may be configured to obtain the information by hooking relevant APIs of and/or related to the file 120. The information related to the request may comprise a file identifier of the file 120, a command identifier of the command, a user identifier of the user and/or a computer device identifier of the computer device 100, for example.

In Microsoft Windows, a method of intercepting calls to a COM object is to modify or patch the object's virtual methods table (vtable). This table includes pointers to all public methods of a COM object, so an entry in the table can be replaced with a pointer to a hook function.

An alternative method to vtable patching is hooking the function the vtable entry points to by using Detours or similar hooking engines. The function prolog is replaced with a jump instruction to the hook method. However in cases where the vtable entry points to a generic method, then hooking the generic method may result in many different types of objects calling the hook method, which may not be desirable.

A preferred alternative method for intercepting the request uses a COM wrapper. In this method, a COM object creation request is intercepted and the newly created COM instance is wrapped with a wrapper (proxy) object. This wrapper object is a COM object with the same interfaces as the original object. The client code interacts with it, as if it is the original object. The proxy object stores a pointer to the original object, so it can call original object's methods if required. For example, QueryContextMenu and GetCommandString methods may be passed through to the original object. InvokeCommand may be processed to extract and redirect the verb along with the associated file information. While the wrapper object must implement all the methods of the COM object interface(s), including 'Unknown for example, advantageously the wrapper object may also store additional context information, relevant to the newly created object. In one example, the agent plugin 130 comprises a wrapper.

In one example, the agent plugin 130 is configured to intercept the request by intercepting a request to create a context menu for the file 120, wherein the context menu includes a plurality of verb commands, each verb command corresponding to a respective command on the file 120.

Generally, context menus (also known as contextual, shortcut, popup or pop-up menus) are menus in graphical user interfaces (GUIs) that are created and displayed in response to user interaction with an object, such as a right-click mouse operation on the object (for example, the file 120). Context menus offer limited sets of choices (i.e. commands) that are available according to current states, or contexts, of the operating systems (for example, the operating system 102) or applications (for example, the file 120) for which the menus are created. Usually, the available choices are related to actions, for example commands, that may be executed or invoked on the object. For example, the available choices may include Open, Run, Run as, Send to and Print, as described below.

That is, the commands may cause tasks to be performed on the computer device 100 and/or the network 10. Some of these tasks may be considered 'untrusted' tasks. Notably, 'untrusted' does not mean that the respective task is necessarily malicious. Instead, the untrusted task simply has the possibility of introducing undesired effect, such as interfere with other tasks or content on or accessible via the computer device 100. For example, untrusted tasks may include certain forms of Web browsing, viewing email files, starting an untrusted application program, or accessing a particular file in a storage medium. Hence, it is desirable to control execution of commands on files.

A function SHCreateDefaultContextMenu creates an object implementation of an IContextMenu interface that represents the Shell's default context menu handler, using HRESULT SHCreateDefaultContextMenu(_In_const DEFCONTEXTMENU *pdcm, REFIID riid, _Out_void **ppv). This function is used by Windows to create the shortcut menu when a user clicks on an object anywhere in the Shell, including Windows 8 and above. Therefore if this function is hooked to intercept the creation of the context menu, it is possible to use the DEFCONTEXTMENU parameter to understand the object(s) that were selected as well as hooking the returned IContextMenu COM interface to intercept and redirect the methods for our own purpose!

The context menu includes the plurality of verb commands, each verb command corresponding to a respective command on the file 120. Particularly, each command is associated with a unique verb command. A verb command may be a text string that is used to identify the respective command. Typically, each verb command corresponds with a command string used to launch a defined application, for example the file 120.

Generally, operating systems (for example, the operating system 102) define standard sets of commonly used verb commands, called canonical verbs. The operating systems use the canonical names to automatically generate correctly localized display strings. For example, the Open verb command display string is set to Open on an English operating system, and to the German equivalent on a German operating system.

Examples of canonical verbs in Microsoft Windows include Open (Opens a file or a folder); Opennew (Opens a new file or a folder in a new window); Print (Prints a file); Printto (Permits the user to print a file by dragging it to a printer object); Explore (Opens Windows Explorer with the folder selected); and Properties (Opens the object's property sheet).

In one example, the agent plugin 130 is configured to insert or add a custom verb command into the plurality of verb commands. In one example, the agent plugin 130 is configured to insert or add a custom verb command into the plurality of verb commands in response to intercepting the request to create a context menu for the file 120.

In one example, the agent plugin 130 is configured to insert the custom verb command into the plurality of verb commands comprises by replacing a verb command of the plurality of verb commands with the custom verb command.

Generally, context menus may be extended for specific file types by registering static verbs for the specific file types. For example, in Microsoft Windows, a Shell subkey may be added below a subkey for a ProgID (Programmatic Identifier) of an application associated with a specific file type. Alternatively, a default verb command for the specific file type may be defined by making it the default value of the Shell subkey.

Additionally, a Microsoft Windows registry, for example, may be used to define one or more extended verbs. The associated commands are displayed only when the user right-clicks on an object while pressing the SHIFT key. To define a verb as extended, an "extended" REG_SZ value is added to the verb's subkey. Rather than defining commands in the registry, known as static verbs, a context menu handler may be used to dynamically add verbs to customize a context menu. Context menu handlers are a type of file type handler. As with other handlers, context menu handlers are in-process Component Object Model (COM) objects implemented as DLLs on Microsoft Windows.

In Microsoft Windows, IContextMenu is a powerful but also complex handler to implement, based on in-process COM objects that run on a thread of a caller, which is usually Windows Explorer but can be any application hosting the items. IContextMenu supports verb visibility, ordering, and custom drawing. An IShellExtInit interface is typically used to initialize the handler, for example by a Shell object. When the Shell object calls IShellExtInit::Initialize, the Shell object passes in a data object with the object's name and a pointer to an item identifier list (PIDL) of the folder that contains the file. The IShellExtInit::Initialize method must extract the file name from the data object and store the name and the folder's pointer to an item identifier list (PIDL) for later use. When verb commands are presented in a shortcut menu, they are first discovered, then presented to the user, and finally invoked:

The Shell calls IContextMenu::QueryContextMenu, which returns a set of verbs that can be based on the state of the items or the system.

The system passes in an HMENU handle that the method can use to add items to the shortcut menu.

If the user clicks one of the handler's items, the Shell calls IContextMenu::InvokeCommand. The handler can then execute the appropriate command.

The Shell calls IContextMenu::QueryContextMenu to enable the shortcut menu handler to add its menu items to the menu. It passes in the HMENU handle in the hmenu parameter. The indexMenu parameter is set to the index to be used for the first menu item that is to be added.

For example, a shell extension based on IContextMenu may be used to customize the shell context menu to dynamically add additional verbs, for example "Run with Defendpoint". The shell extension can also optionally remove or hide menu items like "Run as administrator". This shell extension uses menu-identifier offsets instead of string verbs to identify and perform commands.

In one example, the agent plugin 130 is configured to obtain the information related to the request by obtaining a file identifier of the file 120 from the request to create the context menu.

In one example, the agent is configured to obtain the information related to the request by obtaining a particular verb command from amongst the plurality of verb commands, responsive to a user selection, by the user, of the particular verb command. In one example, the particular verb command is runas.

For example, on Microsoft Windows, IContextMenu::GetCommandString method may be used to return the canonical name for a verb command. This method is called when the user clicks a menu item to tell the handler to run the associated command. The parameter points to a structure that contains the information required to run the command. The verb contained in the structure is typically a string of a canonical verb that specifies the language-independent name of the command to carry out. If a canonical verb exists and a menu handler does not implement the canonical verb, it will return a failure code to enable the next handler to be able to handle the verb. Alternatively, rather than a pointer, the verb parameter can be a menu-identifier offset of the command to carry out. This is often the case where commands where added dynamically by a shortcut menu handler. In this case, the specific menu handler that added the associated menu item performs the command. It may not be possible to determine the action to perform as the menu handler performs this internally.

The agent service 103 is configured to determine whether to execute the command on the file 120 in the user account 110 according to second privileges different from the first privileges. The second privileges may be elevated privileges, for example local administrator privileges. The first privileges may be user or default privileges, for example.

The agent service 103 is configured to determine whether to execute the command on the file 120 in the user account 110 according to the second privileges by consulting a plurality of rules, stored on the computer device 100, according to, at least in part, the forwarded information. In one example, the agent service 103 is configured to determine whether to execute the command on the file 120 in the user account 110 according to the second privileges by permitting or denying, by the agent service 103, the authorization to execute the command.

For example, the agent service 103 may be configured to ensure that only authorized commands are executed on files on the computer device 100. For example, agent service 103 may be governed by the rules, which may be based on trusted application types, thereby automatically denying execution of untrusted tasks. The rules may define conditions under which each command may be executed, in relation to the intended host, such as the computer device 100, and/or the relevant user account, such as the user account 110. Thus, in this example, execution of the command on the file 120 in the user account 110 according to the second privileges may only be permitted according to the rules as used by the agent service 103.

In one example, the agent service 103 is coupled to a policy file. The policy file may store a set of policies (rules) which define responses of the agent service 103 to requested actions or tasks. A policy server may be provided to make policy decisions based on the policy file. The policy server may operate by receiving a policy request message, concerning a requested action and related meta-information, and returning a policy result based thereon. In one example, the agent service 103 is configured to capture a set of identities, and may then provide these identities as part of the policy request. Such identities may include a user identity (UID) of the relevant user account, a group identity (GID) of a group to which that user account belongs, a process identity (PID) of a current process which has initiated the action or task in question, and/or a process identity of a parent process (PPID). Suitably, the policy server determines an outcome for the request based on the provided set of identities relevant to the current policy request.

In one example, the policy file is a structured file, such as an extensible mark-up language XML file. The policy file is suitably held locally on the host device 100, ideally in a secure system location which is accessible to the agent service 103 but which is not accessible by and/or from the user account 110. Updates to the policy file may be generated elsewhere on the network 10, such as by using a management console on one of the servers 20, and then pushed, or pulled, to each instance of the agent service 103 on each device 100. The policy file is readily updated and maintained, ensuring consistency for all devices across the network. In this way, the agent service 103 is robust and manageable for a large-scale organization with many thousands of individual computer devices 100. Also, the agent service 103 is able to leverage rules which have been developed in relation to application control, such as defining user groups or user roles and related application permissions, and now extend those same rules also to privilege management, and vice versa.

In one example, the agent service 103 is configured to determine whether to execute the command on the file 120 in the user account 110 according to the second privileges by establishing authorization from the user to execute the command.

In one example, the agent service 103 is configured to establish authorization by providing a graphical user interface, GUI, dialog comprising at least one of a confirmation, a challenge-response, and a reason and receiving a response therefrom.

The agent service 103 may be configured to perform custom messaging via the dialog. This dialog may be presented in a terminal from which a current action of interest was invoked by or on behalf of the user. Thus, the custom messaging may be presented on a display of the computer device 100 for interaction with the user. Input from the user may be returned to the agent service 103 for evaluation. Hence, the agent service 103 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication and/or authorization to be presented by the user in order to proceed with the requested action. As an example, additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file to meet the evolving needs of a large user population.

Custom messaging allows the agent service 103 to provide a rich and informative set of interactions with the users. Each of these individual custom messaging actions may be defined in the policy file. The custom messaging may eventually result in a decision to allow or block the requested action. An appropriate allow (permit) or block (deny) operation may then be carried out as required.

The agent service 103 may perform auditing in relation to all requests or at least certain requests. The auditing may include recording the customised messaging, and may include recording an outcome of the request. Audit reports may be extracted or uploaded from each computer device 100 such as to the management console on the servers 20 at any suitable frequency. Each of these auditing functions may be defined in the policy.

The agent service 103 is configured to launch the agent proxy process 140 having the second privileges assigned thereto by the agent service 103, if it is determined to execute the command on the file 120 in the user account 110 according to the second privileges, wherein the agent proxy process 140 is configured to cause the command to be executed on the file 120 in the user account 110 by the operating system 103, according to the second privileges assigned to the agent proxy process 140.

Since the agent proxy process 140 causes the command to be executed on the file 120, execution of the command inherits the second privileges assigned to the agent proxy process 140, rather than the first privileges that would otherwise be inherited by default in the user account 110. Further, execution of the command with these second privileges is specifically, for example exclusively, for the command, while execution of other commands in the user account 110 may be according to the first privileges. In contrast, conventional granting of temporary privileges elevates user account privileges, such that all commands executed in the elevated user account are according to the elevated privileges, rather than selectively as according to this invention. In this way, flexibility may be improved while potential attack vector windows, as provided by conventional granting of temporary privileges, may be reduced or avoided.

In one example, the agent proxy process 140 is configured to be terminated after causing the command to be executed on the file 120 in the user account 110. The agent proxy process 140 may be configured to terminate itself (i.e. self-terminate). Additionally and/or alternatively, the agent service 103 may be configured to terminate the agent proxy process 140. By terminating the agent proxy process 140 after the agent proxy process 140 has caused the command to be executed, a potential for exploiting the agent proxy process 140 for malicious purposes is reduced. For example, the agent proxy process 140 may be terminated responsive to the command being executed on the file 120 in the user account 110 by the operating system 103. Alternatively, the agent proxy process 140 may be terminated responsive to termination of execution of the command on the file 120. In contrast, conventional granting of temporary privileges is for a pre-set time period, presenting an increased security risk.

Briefly, at S201, the agent 1000 intercepts, a request in the user account 110 of the logged-in user to execute a command therein on the file 120 according to first privileges assigned thereto. At S202, the agent 1000 obtains information related to the request and determines whether to execute the command on the file 120 in the user account 110 according to second privileges different from the first privileges. At S203 and S204, the agent 1000 causes the command to be executed on the file 120 in the user account 110 by the operating system 103, according to the second privileges if it is determined to execute the command on the file 120 in the user account 110 according to the second privileges.

In more detail, at S201, the agent plugin 130 intercepts a request in the user account 110 of the logged-in user to execute a command therein on the file 120 having the first privileges assigned thereto, wherein the agent plugin 130 is provided for the file. The agent plugin 130 obtains information related to the request. At S202, the agent plugin 130 forwards the information to the agent service 103 cooperating with the operating system 102 of the computer device 100. The agent service 103 determines whether to execute the command on the file 120 in the user account 110 according to the second privileges different from the first privileges. At S203, the agent service 103 launches the agent proxy process 140 having the second privileges assigned thereto by the agent service 103, if it is determined to execute the command on the file 120 in the user account 110 according to the second privileges. At S204, the agent proxy process 140 causes the command to be executed on the file 120 in the user account 110 by the operating system 102, according to the second privileges assigned to the agent proxy process 140.

Figure 3:
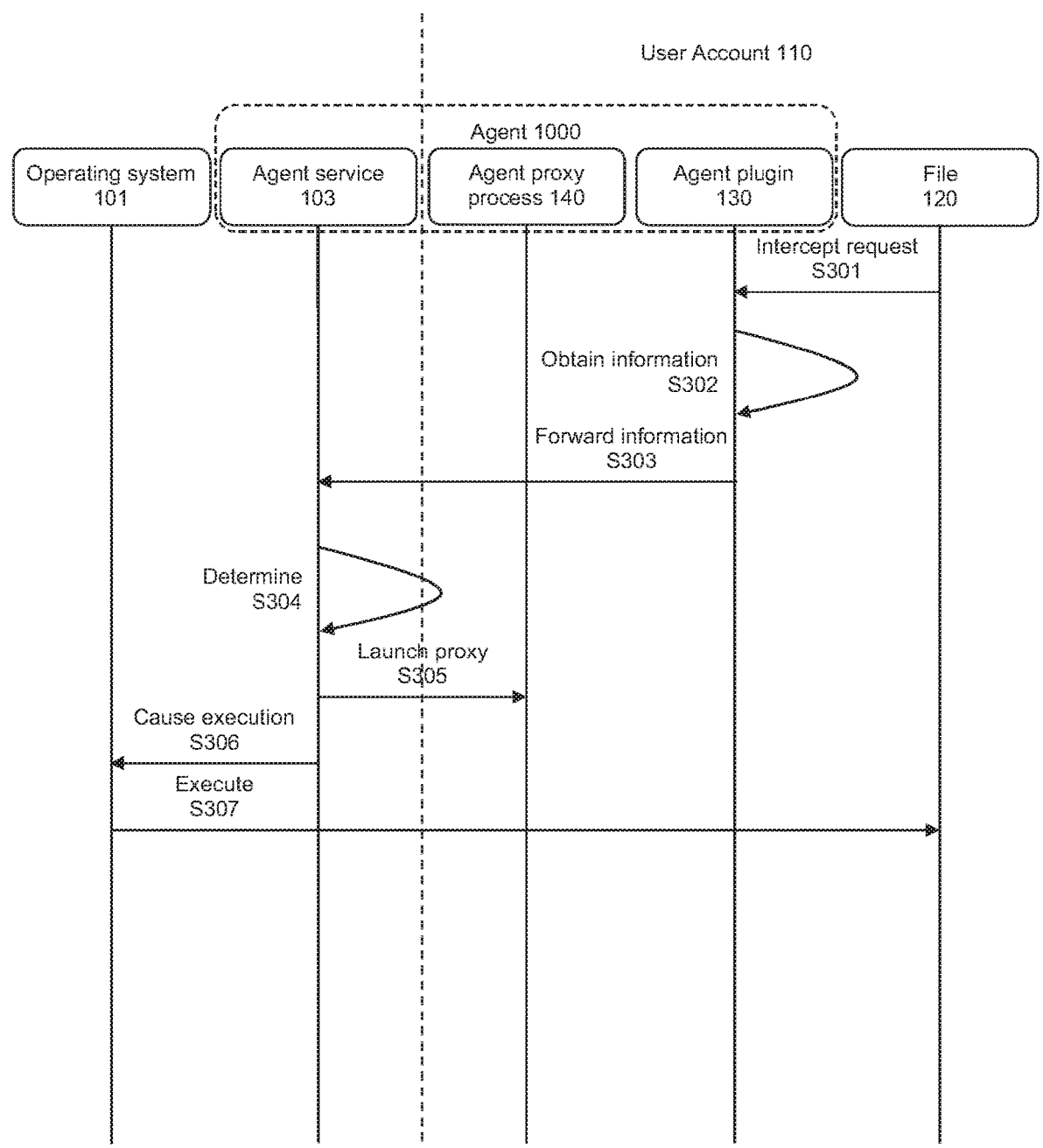
FIG. 3 is a flowchart of an example method of operating the computer device.

FIG. 3 is a flowchart of an example method of operating the computer device 100. The method is of managing privilege delegation to control execution of commands on files 120 on the computer device 100. This example method may include any of the steps described herein.

At S301, the agent plugin 130 intercepts a request in the user account 110 of the logged-in user to execute a command therein on the file 120 having the first privileges assigned thereto, wherein the agent plugin 130 is provided for the file.

At S302, the agent plugin 130 obtains information related to the request.

At S303, the agent plugin 130 forwards the information to the agent service 103 cooperating with the operating system 102 of the computer device 100.

At S304, the agent service 103 determines whether to execute the command on the file 120 in the user account 110 according to the second privileges different from the first privileges.

Determining whether to execute the command on the file in the user account according to the second privileges may comprise consulting a plurality of rules, stored on the computer device 100, according to, at least in part, the forwarded information. Determining whether to execute the command on the file in the user account according to the second privileges may comprise establishing, by the agent service, authorization from the user to execute the command. Establishing authorization may comprise providing a graphical user interface, GUI, dialog comprising at least one of a confirmation, a challenge-response, and a reason, and receiving a response therefrom. Determining whether to execute the command on the file 120 in the user account 110 according to the second privileges may comprise permitting or denying, by the agent service 103, the authorization to execute the command.

At S305, the agent service 103 launches the agent proxy process 140 having the second privileges assigned thereto by the agent service 103, if it is determined to execute the command on the file 120 in the user account 110 according to the second privileges.

At S305, the agent proxy process 140 causes the command to be executed on the file 120 in the user account 110 by the operating system 102 at S306, according to the second privileges assigned to the agent proxy process.

The method may comprise terminating the agent proxy process 120 after causing the command to be executed on the file 120 in the user account 110.

Figure 4:
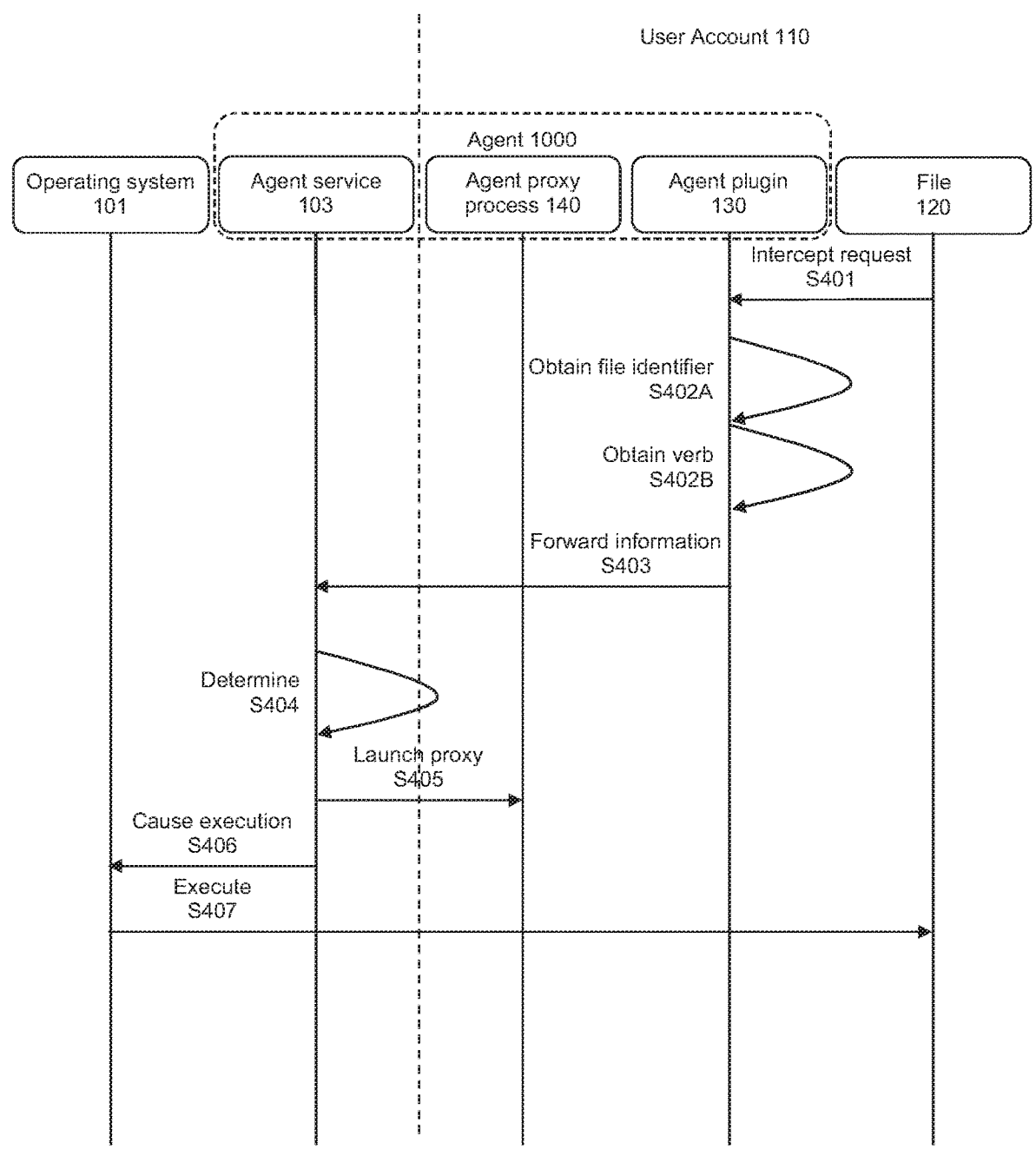
FIG. 4 is a flowchart of another example method of operating the computer device.

FIG. 4 is a flowchart of an example method of operating the computer device 100. The method is of managing privilege delegation to control execution of commands on files 120 on the computer device 100. Particularly, in this example method, a context menu is invoked for the file 120. This example method may include any of the steps described with reference to FIG. 3 and/or described herein.

At S401, the agent plugin 130 intercepts a request in the user account 110 of the logged-in user to execute a command therein on the file 120 having the first privileges assigned thereto, wherein the agent plugin 130 is provided for the file. For example, the agent plugin may intercept SHCreateDefaultContextMenu, as described previously. In this example, intercepting the request comprises intercepting the request to create a context menu for the file 120, wherein the context menu includes a plurality of verb commands, each verb command corresponding to a respective command on the file 120. The method may comprise inserting, by the agent plugin, a custom verb command into the plurality of verb commands. Inserting the custom verb command into the plurality of verb commands may comprise replacing, by the agent plugin, a verb command of the plurality of verb commands with the custom verb command.

At S402A and S402B, the agent plugin 130 obtains information related to the request.

At S402A, the agent plugin 130 obtains a file identifier of the file 110 from the request to create the context menu.

At S402B, the agent plugin 130 obtains a particular verb command from amongst the plurality of verb commands, responsive to a user selection, by the user, of the particular verb command. For example, the agent plugin may intercept InvokeCommandMethod, as described previously. For example, the particular verb command may be runas.

At S403, the agent plugin 130 forwards the information to the agent service 103 cooperating with the operating system 102 of the computer device 100. In this example, the information comprises the file identifier and the particular verb command obtained by the agent plugin 130 as described above.

At S404, the agent service 103 determines whether to execute the command on the file 120 in the user account 110 according to the second privileges different from the first privileges.

At S405, the agent service 103 launches the agent proxy process 140 having the second privileges assigned thereto by the agent service 103, if it is determined to execute the command on the file 120 in the user account 110 according to the second privileges.

At S405, the agent proxy process 140 causes the command to be executed on the file 120 in the user account 110 by the operating system 102 at S406, according to the second privileges assigned to the agent proxy process. In this way, for example, rather than executing the command run as according to default user privileges (i.e. the first privileges), the command run as is instead executed according to local administrator privileges (i.e. the second privileges), such that effectively, the command run as administrator is executed.

The example embodiments have many benefits and advantages, as will now be appreciated from the discussion herein. In particular, privilege delegation for each computer device in the network is managed more efficiently and with enhanced functionality.

In summary, there is described an improved computer device and method for managing privilege delegation to control execution of commands on files on the computer device. Particularly, by intercepting requests in user accounts to execute commands therein on files according to first privileges assigned thereto and determining whether to execute the commands on the files according to second privileges, the commands are executed on the files in the user accounts according to the second privileges, for example via agent proxy processes launched in the user accounts. This mechanism may be specifically for the requests. In addition, the first privileges associated with the user accounts may be unchanged by this mechanism. In this way, scalability may be improved since administrative burden may be reduced. Furthermore, flexibility may be improved, because privilege delegation may be available dynamically and/or on an ad hoc basis, for example for specific commands and/or specific files. In addition, since the commands are executed on the files via the agent proxy processes having the second privileges assigned thereto, rather than by assigning the second privileges to the user account as may be provided conventionally for example, a security vulnerability may be reduced.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A system, comprising:
a memory configured to store an operating system; and
at least one computing device comprising processing circuitry operatively connected to the memory, the processing circuitry being configured to:
insert a custom verb command into a plurality of verb commands corresponding to a file;
intercept a request to execute the custom verb command on the file according to first privileges by intercepting a request to create a context menu for the file, wherein the context menu includes the plurality of verb commands;
obtain information related to the request to execute the custom verb command by obtaining a file identifier of the file from the request to create the context menu;
determine whether to execute the custom verb command on the file according to second privileges different from the first privileges based on the information related to the request to execute the custom verb command; and
cause the custom verb command to be executed on the file according to the second privileges.

2. The system of claim 1, wherein the processing circuitry is further configured to insert the custom verb command into the plurality of verb commands by replacing one of the plurality of verb commands with the custom verb command.

3. The system of claim 1, wherein the processing circuitry is further configured to determine whether to execute the custom verb command on the file according to the second privileges by applying a plurality of rules based on the information related to the request to execute the custom verb command.

4. The system of claim 1, wherein the plurality of verb commands comprises at least one extended verb.

5. The system of claim 1, wherein the processing circuitry is further configured to remove at least one of the plurality of verb commands.

6. A method, comprising:
inserting, via at least one computing device, a custom verb command into a plurality of verb commands corresponding to a file;
intercepting, via the at least one computing device, a request to execute a command on the file according to first privileges by intercepting a request to create a context menu for the file, wherein the context menu includes the plurality of verb commands;
obtaining, via the at least one computing device, information related to the request to execute the command by obtaining a file identifier of the file from the request to create the context menu;
determining, via the at least one computing device, whether to execute the command on the file according to second privileges different from the first privileges based on the information related to the request to execute the command;
in responsive to determining to execute the command on the file, launching, via the at least one computing device, an agent proxy process with the second privileges; and
causing, via the agent proxy process, the command to be executed on the file according to the second privileges assigned to the agent proxy process.

7. The method according to claim 6, wherein each of the plurality of verb commands corresponds to a respective data structure, the respective data structure comprising a string of a respective canonical verb.

8. The method according to claim 7, further comprising rendering, via the at least one computing device, the context menu for the file on a display based on the string of the respective canonical verb for at least one of the plurality of verb commands.

9. The method according to claim 6, wherein intercepting the request to execute the command comprises intercepting a creation request for a COM object.

10. The method according to claim 9, further comprising wrapping the COM object with a wrapper object, wherein the wrapper object comprises a same interface as the COM object.

11. The method according to claim 10, further comprising:
passing, via the wrapper object, a first command of the plurality of verb commands to the COM object based on a stored pointer to the COM object; and
redirect, via the wrapper object, a second command of the plurality of verb commands to an agent plugin.

12. The method according to claim 6, further comprising obtaining the information related to the request to execute the command by obtaining a particular verb command from the plurality of verb commands in response to a selection of the particular verb command.

13. A non-transitory computer-readable medium embodying a program that, when executed by at least one computing device, causes the at least one computing device to:
insert a custom verb command into a plurality of verb commands corresponding to a file;
intercept a request to execute a command on the file according to first privileges by intercepting a request to create a context menu for the file, wherein the context menu includes the plurality of verb commands;
obtain information related to the request to execute the command by obtaining a file identifier of the file from the request to create the context menu;
determine whether to execute the command on the file according to second privileges different from the first privileges based on the information related to the request to execute the command;
in responsive to determining to execute the command on the file, launch an agent proxy process with the second privileges; and
cause, via the agent proxy process, the command to be executed on the file according to the second privileges assigned to the agent proxy process.

14. The non-transitory computer-readable medium of claim 13, wherein the plurality of verb commands are each unique with respect to each other.

15. The non-transitory computer-readable medium of claim 13, wherein the plurality of verb commands comprises at least one static verb corresponding to a type of the file.

16. The non-transitory computer-readable medium of claim 13, wherein the program further causes the at least one computing device to terminate the agent proxy process after causing the command to be executed on the file.

17. The non-transitory computer-readable medium of claim 13, wherein the program further causes the at least one computing device to hide at least one of the plurality of verb commands.

18. The non-transitory computer-readable medium of claim 13, wherein the program further causes the at least one computing device to:
- determine a first menu handler does not implement a canonical verb corresponding to the custom verb command based on a return of a failure code; and
- handle the canonical verb via a second menu handler.

19. The non-transitory computer-readable medium of claim 13, wherein the program further causes the at least one computing device to:
- transmit a policy request message regarding the command; and
- receive a policy result based o the policy request message, wherein determining whether to execute the command on the file according to the second privileges is based on the policy result.

20. The non-transitory computer-readable medium of claim 19, wherein the policy request message is transmitted to a policy server to make policy decisions based on a policy file, and the policy request message comprises metainformation relating to the request to execute the command on the file.

* * * * *